United States Patent [19]
Kessler et al.

[11] Patent Number: 6,154,683
[45] Date of Patent: Nov. 28, 2000

[54] LOW VOLTAGE INDUSTRIAL CONTROL SYSTEM PROVIDING INTRINSICALLY SAFE OPERATION

[75] Inventors: Michael Wolfgang Kessler, Laudenbach; Robin-David Slater, Dossenheim, both of Germany; Robert J. Kretschmann, Bay Village, Ohio; Martin Junker, Darmstadt, Germany; John D. Crabtree, Akron, Ohio

[73] Assignee: Rockwell Technologies, LLC, Thousand Oaks, Calif.

[21] Appl. No.: 09/090,204

[22] Filed: Jun. 3, 1998

Related U.S. Application Data

[60] Provisional application No. 60/048,866, Jun. 6, 1997.

[51] Int. Cl.$^7$ ...................................................... G06F 19/00
[52] U.S. Cl. .............................. 700/150; 700/266; 700/21
[58] Field of Search ................................... 700/150, 266, 700/274; 712/1

[56] References Cited

U.S. PATENT DOCUMENTS

| | | |
|---|---|---|
| 3,973,170 | 8/1976 | Hogan ........................................ 317/16 |
| 5,583,764 | 12/1996 | Nail et al. .................................... 702/2 |
| 5,623,401 | 4/1997 | Baxter . | |

*Primary Examiner*—Meng-Ai T. An
*Assistant Examiner*—Mackly Monestime
*Attorney, Agent, or Firm*—Keith M. Baxter; John J. Horn; William R. Walbrun

[57] ABSTRACT

Low voltage logic circuitry is used to permit an entire subsystem of an industrial controller to be placed within a hazardous environment to receive a high speed serial link and undertake the control of multiple control points without expensive and awkward long cable runs and electrically isolating circuits for each cable run. Energy and bandwidth limiting on the high speed link allows power levels commensurate with high data rates yet intrinsic safety of the media allowing it to freely pass in and out of the hazardous area. A mixture of intrinsically safe and non-intrinsically safe equipment on the same logical rack is allowed through a bus isolator providing isolated data communication in backplane fashion between modules while wholly isolating power transmission along the backplane.

19 Claims, 3 Drawing Sheets

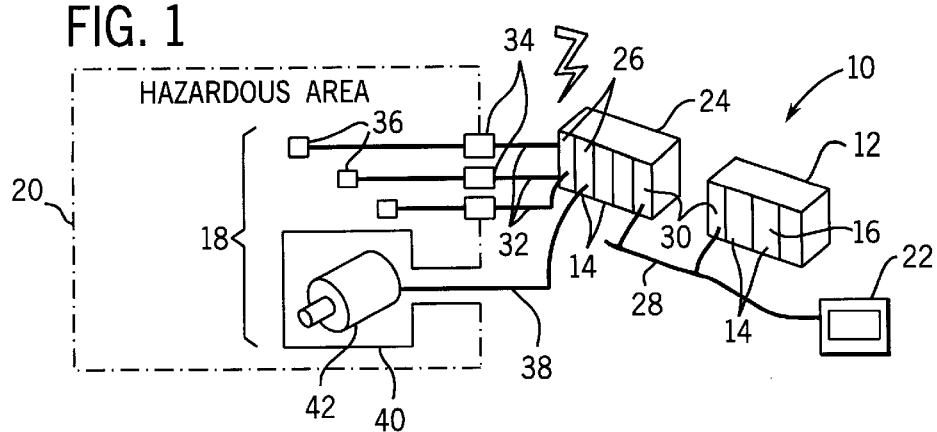
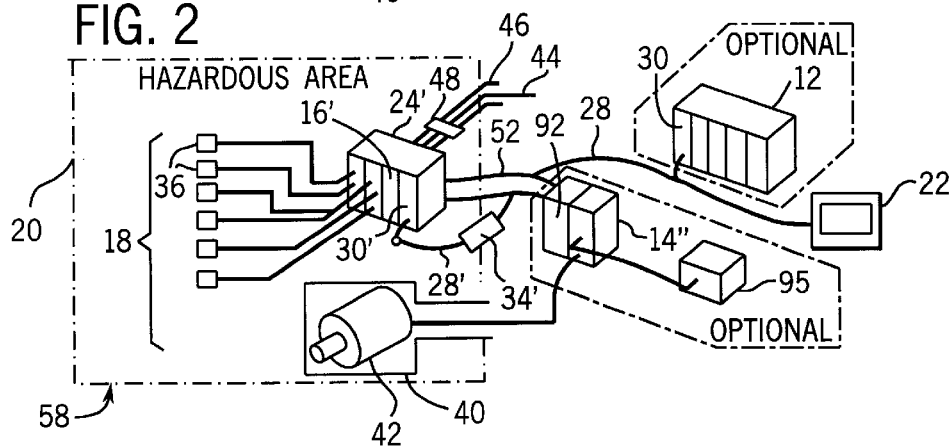
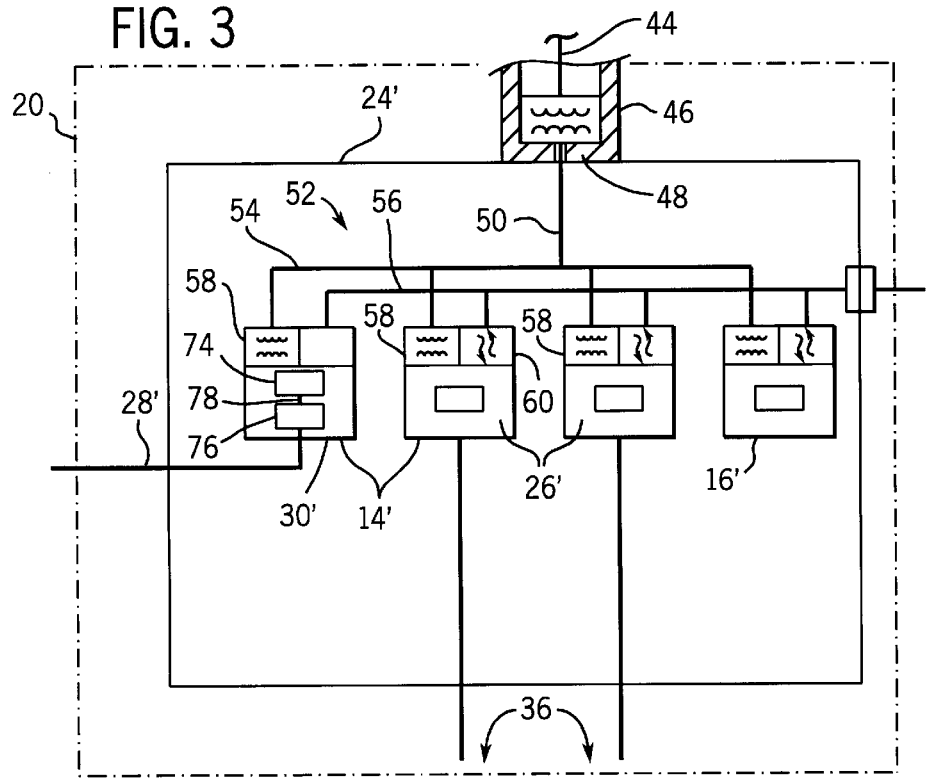

LOW VOLTAGE INDUSTRIAL CONTROL SYSTEM PROVIDING INTRINSICALLY SAFE OPERATION

CROSS-REFERENCE TO RELATED APPLICATIONS

This application clams the benefit of provisional application No. 60/048,866 filed Jun. 6, 1997.

STATEMENT REGARDING FEDERALLY SPONSORED RESEARCH OR DEVELOPMENT

BACKGROUND OF THE INVENTION

The present invention relates to industrial control systems and in particular to an industrial control system for use in explosive or other hazardous environments.

Industrial controllers are special purpose computers used for controlling factory automation and the like. Under the direction of a stored program, a processor of the industrial controller examines a series of inputs reflecting the status of a controlled processor or device and changes outputs affecting control of the controlled process or device.

Generally industrial controllers are constructed in modular fashion to accommodate different applications requiring different numbers and types of input/output (I/O) circuits as is determined by the particular device or process being controlled. In such modular systems, a number of different functional modules connect together through a common backplane in a rack or the like to share data and power.

Often a controlled process may require control points (e.g., sensors or actuators) in an environment exposed to combustible vapors or airborne particles. In such hazardous environments, electrical arcing or excessive temperature in electrical equipment can cause an explosion. Electrical equipment intended for use in such hazardous environments must conform to certain safety standards intended to reduce the chance or effect of an explosion. Under such standards, the equipment may be placed in a special housing that is flame-proof or explosion-proof. Alternatively, the housing may be charged with an inert gas to prevent the infusion of explosive fumes. Other methods of protection are also available for use in hazardous environments, one of particular note is intrinsic safety.

Equipment that is designed to be "intrinsically safe" generally indicates that the electrical energy used by the equipment is properly limited or constrained to avoid the occurrence of sparks with sufficient energy to ignite a flammable atmosphere during a fault condition, and the surface temperatures are constrained to be below those needed to cause spontaneous ignition. Fault conditions must be considered as well as the energy storage characteristics of the components of the equipment.

A number of agencies certify equipment to an intrinsic safety standard. See generally, Underwriter's Laboratories document UL-913,1988, Intrinsically Safe Apparatus And Associated Apparatus For Use In Class I, II, and III, Division I, Hazardous (Classified) Locations. See also, National Electrical Code Handbook, 1993, Article 500, Hazardous (Classify) Locations, Article 504, Intrinsically Safe Systems, Article 505, Class I, Zone 0, 1 and 2 Locations. See also, FM Cl. No.3600, March 1989, Electrical Equipment for Use in Hazardous (Classified) Locations General Requirements and Cl. No. 3610, October 1988, Intrinsically Safe Apparatus and Associated Apparatus for Use in Class I, II, III, Division 1 Hazardous (Classified) Locations. See also, EN50014:1992, Electrical Apparatus for Potentially Explosive Atmospheres, EN50020:1994, Electrical Apparatus for Potentially Explosive Atmospheres—Intrinsic Safety 'i' and EN50039:1980, Electrical Apparatus for Potentially Explosive Atmospheres—Intrinsically Safe Electrical Systems 'i'. These documents are hereby incorporated by reference.

The terms "intrinsic safety" and "intrinsically safe" as used herein do not indicate that the equipment presents no danger or that it meets the above standards but only that it is designed to permit use in some hazardous environments without additional precautions such as explosion-proof casings and the like.

In a typical control system where a portion of the controlled process is in a hazardous area, the industrial controller will be placed a distance away in a "safe" or non-hazardous area free from combustible gases. Input and output signals to and from the portion of the controlled process in the hazardous area are carried by long cables leading from the industrial control system to the respective portion of the controlled process. Where the components of the controlled process require high power levels, those components must be shielded by specialized housings to either protect them from combustible gases or to contain any explosion caused by arcing.

Those components in the hazardous area which use low levels of electrical power (insufficient to create an arcing hazard) must still be protected from possible fault conditions where a high voltage from the non-hazardous area inadvertently is conducted along the cables into the hazardous area. For this reason, cables passing into the hazardous area from the non-hazardous area, even for low power components, must first pass through a barrier circuit or an isolating circuit (penetrator circuits).

Barrier circuits shunt hazardous energy to special ground connections. In a typical barrier circuit, electrical power passing from the non-hazardous area to the hazardous area will pass through a fuse to the cathodes of one or more voltage limiting Zener diodes having their anodes connected to ground. High voltages are thus shunted safely to ground. Current into the hazardous area is limited by a resistor following the voltage limiting Zener diodes. Isolators work by separating the two halves of a conductor so there is no direct current path for any hazardous energy from the non-hazardous side to the hazardous area. A typical isolator may use transformers, capacitors or optical-type isolators as its means of separating two halves of a conductor.

When there are many points of control in a hazardous area, the cost to the control system may be substantial driven by the cost of the barriers or isolators (both in materials and in installation) for each control point, the long runs of wiring, and the need for a separate, removed non-hazardous control area in which to place the control system.

BRIEF SUMMARY OF THE INVENTION

The present inventors have recognized that the modern digital logic used in industrial controllers is of such low voltage so as to be intrinsically safe with little modification. Accordingly, it is possible to place a substantially complete industrial controller wholly within the hazardous area. In this way, the need for expensive barriers or isolators, long wire runs, and separate non-hazardous control areas can be avoided.

Whereas most control systems for hazardous areas require some communication with non-hazardous areas, the present invention also provides for a high speed serial link to communicate between the hazardous and non-hazardous areas. The serial link carries all the data previously carried over individual isolated wiring runs but requires far fewer penetrator circuits.

When the controller or a portion of the controller is placed in the hazardous area, there may be a need to control one or more points that are not intrinsically safe. The present invention allows a mixing of intrinsically safe and non-intrinsically safe functional modules on one logical rack through the use of a bus isolator. This permits a single logical I/O rack, for example, to support both hazardous and non-hazardous control points without the complexity or cost of multiple I/O racks with separate connections to the serial link.

The industrial controller of the present invention also provides a source of intrinsically safe power to control points of the controlled process rather than requiring an independent source of power through a barrier or isolator from the non-hazardous area. Normally a source of power with sufficient voltage to use with the controlled process (e.g., 19 volts) could not provide both the power (voltage times current) needed to run the logic of the industrial controller and the power consumed by the signals to and from the controlled process. The present inventors have recognized, however, that greater power can be obtained at low voltages, sufficient to run both the industrial controller and the controlled points, without violating the requirements that the power be intrinsically safe. Once received by the controller, the power is stepped up for use with control points. This later power to the control points is monitored and regulated to ensure that it remains intrinsically safe even with possible fault conditions at the control point. This recognition of the possibility of providing greater intrinsically safe power at lower voltages also allows the entire controller, including the processor, and not just the I/O modules to be placed within the hazardous area.

Specifically, the present invention provides an industrial controller reading inputs from an industrial device and providing outputs to the industrial device under the direction of a stored control program. The industrial controller includes an energy limiting power supply meeting intrinsically safe power limits and a serial network port for receiving and transmitting data over serial network media using signals satisfying intrinsically safe power limits. A processor receiving power from the energy limiting power supply, executes a stored control program controls a plurality of interface circuits also receiving power from the energy limiting power supply and communicating electrical signals satisfying intrinsically safe power limits between the industrial controller and the industrial process. Low voltage digital circuitry receiving power from the energy limiting power supply communicates data between the serial network port and ones of the interface circuits.

Thus it is one object of the invention to limit the number of separate conductors passing between non-hazardous areas and hazardous areas by placing the entire controller in the hazardous area.

The serial network port may bandlimit the data signals transmitted so as to selectively limit the power of low frequencies of those signals.

Thus it is another object of the invention to allow use of a high speed serial data link, normally requiring increased power in the transmitted signals, by reducing low frequency components believed to be more likely to present ignition hazards.

The serial network port may also limit the instantaneous power of the data signals and may galvanically isolate the industrial controller from the data signals of the serial network media.

Thus it is another object of the invention to allow the serial network media to pass freely in and out of the hazardous area between intrinsically safe and non-intrinsically safe equipment by ensuring that power transmitted into and received from the serial link is intrinsically safe.

A bus isolator having a first and second backplane connector configured to mate to a first bus of the first industrial control component and a second bus of the second industrial control component may provide galvanic isolation between those backplane connectors and an energy limited power supply meeting intrinsically safe power limits to provide power to the second connector.

Thus it is another object of the invention to permit a single logical I/O rack to contain both intrinsically safe and non-intrinsically safe I/O modules. The bus isolator ensures isolation between these modules and provides a source of safe power obviating the need for a second network connection.

The plurality of interface circuits in the industrial controller may be removably attached to a common bus so as to allow different functional modules to be placed in a given industrial controller. Each functional module may connect to power of the bus through isolation circuitry.

Thus is another object of the invention to ensure that power storage qualities of the individual modules do not combine to jeopardize the intrinsically safe quality of the industrial controller.

The foregoing and other objects and advantages of the invention will appear from the following description. In the description, reference is made to the accompanying drawings which form a part hereof and in which there is shown by way of illustration a preferred embodiment of the invention. Such embodiment does not necessary represent the full scope of the invention, however, and reference must be made to the claims herein for interpreting the scope of the invention.

BRIEF DESCRIPTION OF THE SEVERAL VIEWS OF THE DRAWINGS

FIG. 1 is a simplified perspective view of a prior art control system used when a portion of the controlled process is in a hazardous area and showing the need for multiple penetrator circuits;

FIG. 2 is a figure similar to that of FIG. 1 showing a more complex controlled process where the entire controller may be is placed directly in the hazardous area to reduce the need for multiple penetrator circuits and long wire runs;

FIG. 3 is a schematic block diagram of the intrinsically safe controller of FIG. 2 showing its receipt of hazardous power and distribution of safe power to its functional modules each of which is additionally isolated from a common backplane both in data and power, and showing a bus isolator for optionally connecting the backplane of the controller to an external rack in a non-hazardous area, and showing a communication module for connecting the intrinsically safe controller to a high speed serial link;

DETAILED DESCRIPTION OF THE INVENTION

Figure 4:
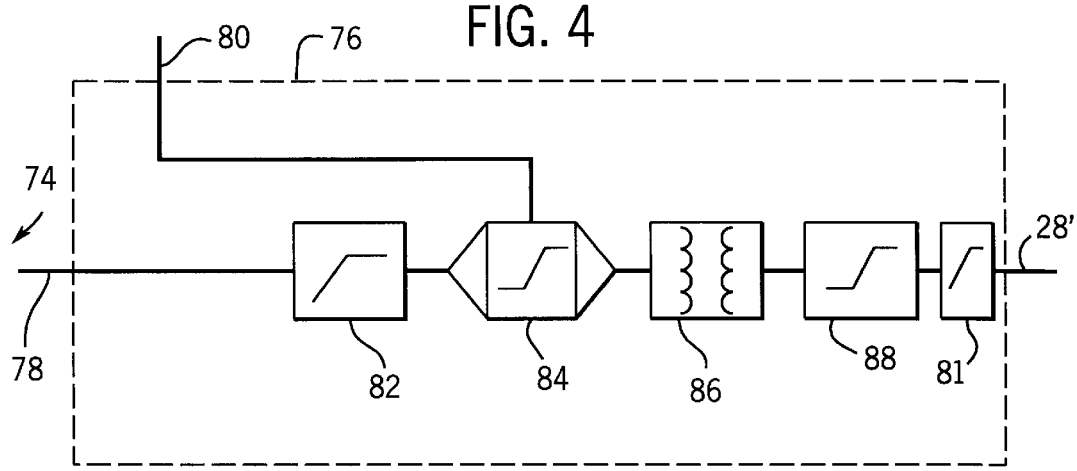
FIG. 4 is a detailed block diagram of the communication module of FIG. 3 showing power limiting and bandwidth limiting circuitry as renders the serial link intrinsically safe.

Referring to FIG. 1, in a prior art control system, an industrial controller 10 includes a controller 12 and a remote I/O rack 24, both located in an area without hazardous materials present (non-hazardous area). The controller 12 has a plurality of functional modules 14 including a processor 16 executing a stored program to control a controlled process 18, a portion of which is in a hazardous area 20 (an area with hazardous materials present). The remote I/O rack also includes a plurality of functional modules 14, which are principally I/O modules 26. The modules 14 of the controller 12 and the I/O rack 24 communicate with each other via an internal backplane, not shown.

The controller 12 may communicate with a control terminal 22 used to monitor the process and to enter and edit the stored program. The control terminal 22 may also communicate with the remote I/O rack 24. The controller 12, remote I/O rack 24 and control terminal 22 communicate via a high speed serial link 28 connecting communication modules 30 on each of the controller 12, remote I/O rack 24 and control terminal 22.

Cables 32 from various of the I/O modules 26 pass through penetration circuits 34 from the non-hazardous area into the hazardous area 20 to receive input data from low power control points 36 or to provide low power actuation signals to those control points 36. A high power cable 38 passes from an I/O module 26 into an explosion-proof housing 40 to high power control point 42.

The prior art system generally requires long wire runs for cables 32 and 38, and costly multiple penetration circuits 34.

Referring now to FIG. 2, a substantially greater number of control points 36 may be handled on the controlled process 18 without the use of penetration circuits 34 by making the I/O rack 24' intrinsically safe, placing the I/O rack 24' in the hazardous area 20, and placing a processor module 16 in the I/O rack 24' to provide for an industrial controller 10' wholly contained within the hazardous area 20. Only two principal penetrations of the hazardous area 20 are now required, one for serial link 28' connecting I/O rack 24 to the control terminal 22 and one for non-intrinsically safe power 44 to enter the hazardous area 20. Because such power 44 is not intrinsically safe, supplemental shielding 46 must be provided up to the point where it exits out of the hazardous area 20.

Referring now also to FIG. 3, I/O rack 24' receives the non-intrinsically safe power 44 from isolator 48 which converts non-intrinsically safe power 44 to intrinsically safe power 50 by galvanically isolating non-intrinsically safe power 44 from intrinsically safe power 50 and by providing limits to power flow through isolator 48 according to techniques understood in the art. Generally isolator 48 provides galvanic isolation through the inductive path of a transformer constructed with sufficient insulation and air gap to prevent a direct DC path between non-intrinsically safe power 44 and intrinsically safe power 50 in most anticipated over voltage situations. Conventional current and voltage limiting techniques are then used to limit the power passing to intrinsically safe power 50. These techniques may include use of a saturatable core transformer together with fuses, crowbar circuits and resistive and Zener limiting according to techniques well understood in the art.

Intrinsically safe power 50 passes to an internal backplane 52 to power that backplane power lines 54 of that backplane 52 which also includes data lines 56. Attached to the backplane 52 are a plurality of functional modules 14' including a communication module 30', a processor module 16' executing a stored control program, and several I/O modules 26'. Backplane 52 is modular and may be extended by attaching additional backplane sections to connectors on the backplane 52 as is understood in the art.

Figure 6:
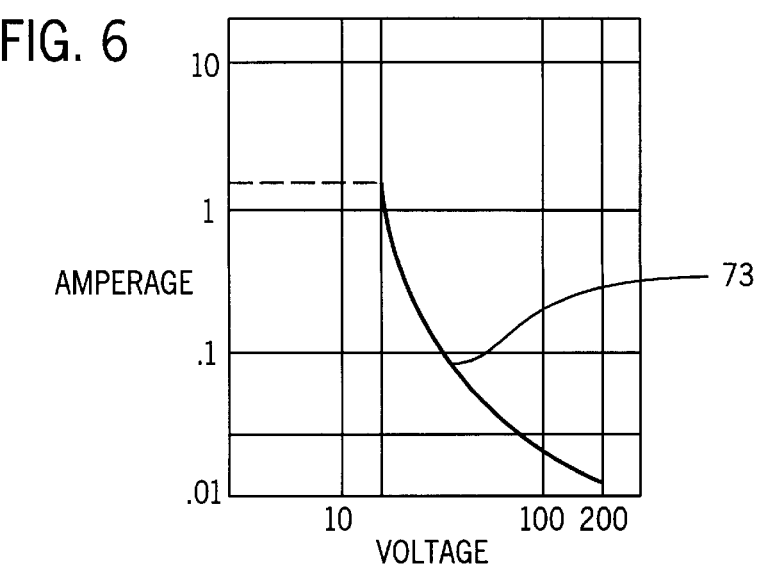
FIG. 6 is a plot of voltage vs. amperage indicating an intrinsically safe region as followed by the regulated power of the I/O module of FIG. 5.

In distinction from the non-intrinsically safe I/O rack 24 described with respect to FIG. 1, the backplane 52 is intrinsically safe, operating with an intrinsically safe power source 50 and at voltages and currents suitable for normal logic level devices and coincidentally, at intrinsically safe power levels. Referring now to FIG. 6, an intrinsically safe zone may be defined in terms of total current and voltage (i.e. power) beneath curve 73. Normally curve 73 is further discounted by a safety factor.

The curve 73 below ten volts is not well characterized and therefore is shown by a dotted horizontal line. However, the present inventors recognize that sufficient power for operating an entire industrial controller (and providing power for the signals to and from the controlled process) can be made available to supply even complex logic level devices by using voltages below ten volts (and in fact in many cases operating at about five volts) that will be intrinsically safe. This power will be sufficient to operate high numbers of I/O in one module. The possibility of placing the entire the industrial controller 10 in the hazardous area is thus rendered possible.

The intrinsically safe standards consider not only the instantaneous voltages and currents used by the device but the potential for energy storage in capacitances or inductances (entity parameters) that would concentrate sufficient energy to create a spark or temperature (e.g., via resistive heating) sufficient to ignite gases in an explosive atmosphere. The backplane 52 is characterized as to inductance and capacitance to ensure such energy concentrations do not occur. On the other hand, the very modularity of the I/O rack 24', allowing different functional modules 14' makes characterization of the energy storage capacity of the entire remote I/O rack 24' more difficult. Accordingly, each module 14' receiving power from power line 54 of backplane 52 receives that power through an additional isolator 58 similar to isolator 48. In this way the backplane 52 is isolated from potential energy storage of the modules 14' and each module 14' is isolated from other modules 14'. Such isolation may be provided by an inductive coupling circuit such as a transformer with or without additional power limiting circuitry.

The isolation provided by isolators 58 also means that each control point 36 may be treated separately with respect to the intrinsically safe power determination. Generally each I/O module may have a rated voltage, current, capacitance and inductance indicating a maximum design additional capacitance, inductance or power added to the control point that will still provide intrinsically safe operation. So long as the control point has parameters less than these ratings, they may be used with the I/O module while preserving intrinsically safe operation.

The data of the backplane 52 transmitted along data lines 56 is also isolated as it connects to the modules 14' by isolator 60 which may be a capacitive or inductance-type isolator or, because relatively little power is transmitted in the data, by an optical isolation system such as is well known in the art. The risk of faults from shorts between the data lines and power lines, potentially communicating power along data lines 56 between modules 14' is thus eliminated.

The data lines 56 connecting the modules 14' are part of a multiple conductor bus structure, as is understood in the art, communicating words of data to modules 14' as decoded by the communication module 30' receiving the data in serial fashion from the serial link 28'. Similarly, words of data produced by the modules 14' are collected and transmitted serially by communication module 30' (also known as adapter or gateway) on serial link 28'. Generally the communication module 30 collects multiple data values from the modules 14' and collects and formats them for serial transmission and takes serial transmissions and decodes them into multiple data value to be distributed to the modules 14'. Through this technique, an arbitrarily large number of control points 36 may be accommodated by the remote I/O rack 24' and the data communicated to and from the control points 36 collected and sent over a relatively limited number of conductors of serial link 28'. The passage of the serial link 28 to 28' into the hazardous area 20 requires some protective circuitry as will be described, however, the need for individual penetration circuits 34 for each of the control points is effectively eliminated.

Figure 5:
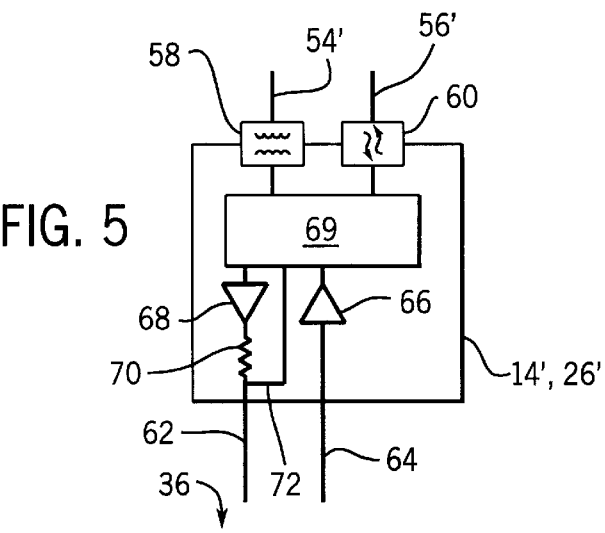
FIG. 5 is a detailed block diagram of an I/O module of the controller of FIG. 3 showing its regulated power output.

Referring now also to FIGS. 3 and 5, an input module 26' may provide a source of safe power to the control point 36 as derived from isolator 48 (shown in FIG. 3) through isolator 58. By providing power on output line 62, the need for an additional penetration circuit 34 to bring power to control points 36 which require power is thereby avoided. For example, an output line 62 may provide power to a sensor which returns a signal along input line 64 received by conventional input circuitry 66 understood in the art. The input signal on input line 64 may be digital or analog and converted to digital signals according to well known analog to digital conversion techniques and provided to circuitry 69 which may perform processing according to an internal stored program and may transmit relevant data from the input through isolator 60 onto data lines 56 and ultimately to processor 16'. The digital circuitry 69 typically includes a microprocessor operating at standard logic levels of approximately five volts and thus can be made intrinsically safe when powered from the intrinsically safe power 50 (shown in FIG. 3).

The output line 62 may be powered by a switching power supply 68 nominally regulated to a predetermined voltage level (e.g., 19 volts) higher than that provided by the intrinsically safe power source 50. The switching power supply 68 thus provides a step up of voltage either through an associated transformer. The output of the switching power supply 68 is in series with a current limiting resistor 70 which in turn connects with output line 62. The current limiting resistor 70 provides current limiting to control point 36 in the event of a fault which might increase current levels beyond intrinsically safe levels. The current limiting also ensures that sufficient power remains for operation of the other circuitry of the industrial controller 12'.

In order to reduce power dissipation in the module 14' and possible failure of components or undesirable temperature rise, a sensing lead 72 is attached at resistor 70 to provide a reading of current flow to the control points 36 (via voltage drop across resistor 70). The switching power supply is further regulated to limit the power dissipation across resistor 70 by lowering its output voltage appropriately in response to the sensed current. Curve 73 (shown in FIG. 6) may be used to derive the resistance value for resistor 70 so that the power on output line 62 always remains beneath the curve 73. The switching power supply 68 limits the actual dissipation in the resistor 70 and operates in a class D mode and thus produces relatively low power dissipation itself regardless of its output voltage. Such switching regulators are well known in the art.

The switching power supply 68 may be also controlled by the logic circuitry 69 so that several levels of fault may be detected and responded to, each level fault providing a limiting of current by the switching power supply 68 based on monitoring of resistor 70. If monitoring of resistor 70 indicates excessive power draw by the control point 36, the output voltage will be reduced and then after a predetermined time, increased again to see whether the additional power drain has been eliminated. If not, the output voltage will again be limited. Multiple occurrences of limiting within a predetermined period of time will cause a fault condition reported to the user with a shutting down of the output. Nevertheless, momentary paths of low resistance as may be caused by technicians measuring voltage with low impedance devices can be accommodated safely without a fault condition.

In similar manner, depending on exact functional requirements of module 26', the switching power supply may monitor the output voltage to provide just sufficient levels to ensure proper operation of control point 36 but no more that may cause excessive power loss and temperature rise within module 26'.

Referring now to FIGS. 2, 3 and 4, the placing of the controller contained in I/O rack 24' in the hazardous area 20, as mentioned, requires safe passage for non-intrinsically safe power 44 such as may be provided by a shielding technique and for passage of the serial link 28 to 28'. These two passages in the hazardous area 20 are all that is required for an arbitrarily large number of intrinsically safe control points 36, that is, control points 36 that can be actuated or that provide for the detection of signals using intrinsically safe levels of electrical power.

Unlike the non-intrinsically safe power 44 which must be shielded with shielding 46, the present invention makes the entire serial link 28' to 28 intrinsically safe by limiting the power that may be placed on the serial link 28' to 28 and the power may be extracted from the serial link 28' to 28. In this way, the serial link 28' to 28 may pass freely in and out of the hazardous area 20 and may be used to connect multiple remote I/O racks 24' within the hazardous area 20 and to non-intrinsically safe equipment. Alternately, to simplify the requirements on the non-intrinsically safe equipment generally needing to be connected to serial link 28' to 28, a single intrinsically safe penetration circuit 34 may be used when passing serial link 28' to 28 from the hazardous area 20 to the non-hazardous area. It significant that this single penetration circuit is a convenience for the design and use of other devices in the non-hazardous area and does not materially affect the utility of the serial link, since logically the network is contiguous.

Referring to FIG. 3, communication module 30' receives intrinsically safe power through isolator 58 and intrinsically safe data from the backplane 52. The communication module includes a digital logic section 74 providing connected message decoding and translation between serial data on serial link 28' and the data structure of the backplane 52. Digital logic section 74 does not communicate directly with serial link 28' but only indirectly through protection circuitry 76.

Referring to FIG. 4, protection circuitry 76 receives serial data along lines 78 from digital logic section 74 for transmission on serial link 28' and receives data from serial link 28' to be transmitted to digital logic section 74 on line 78. Circuitry 76 also receives a source of intrinsically safe power 80 from the isolator 58. The data on line 78 and on serial link 28' is high speed and uses a five MBaud deterministic network protocol using connected messaging such as is understood in the art.

The data on line 78 passing to serial link 28' is first received by high pass filter 82 having a break point at approximately one megahertz so as to limit the power contributed by low frequency components of the data. Applicants believe that low frequency power is more likely to provide combustible arcing than high frequency power because the short duration of arcing at extremely high frequencies carries insufficient energy in each arc to begin the combustion process and does not accumulate between arcing cycles. Nevertheless, the inventors do not wish to be bound by this particular theory.

Whereas a serial communication channel could be made intrinsically safe by lowering its power to extremely low levels, there is a direct relationship between the speed of information transfer and power needed for that transmission. This relationship results generally from transmission line impedances and background noise in any communication channel. By band limiting the data on the serial link 28', higher powers may be used while still providing intrinsic safety.

The data is next received by power control circuitry 84 which places limits on the voltage and current of the data and also boosts the band limited data in power appropriate for the communication speeds. This circuitry may include conventional amplification electronics receiving intrinsically safe power 80 accompanied with current and voltage limiting circuits, i.e. shunting Zener diodes. The power control circuitry 84 is followed by a galvanic isolator 86 which is a saturable core transformer providing further current limiting and isolation by virtue of the insulated transformer gap. This transformer is followed by additional passive voltage limiting circuitry again being shunting Zener diodes in the preferred embodiment. A final high pass filter 81 and then is attached to serial link 28'.

Data is both transmitted and received through the circuitry 76 limiting both the power transmitted to and received from the serial link 28'.

All connections to the communication serial link 28' to 28 both in and outside the hazardous area 20 may be similar to that provided by circuitry 76. However, as stated earlier for convenience the serial link 28' to 28 passes through a penetration circuit in the preferred embodiment. Thus, the present invention provides a high speed yet intrinsically safe serial communication network which significantly reduces the number of penetrations into the hazardous area by employing a high data rate suitable for the control of many control points 36 in the hazardous area 20.

Referring again to FIG. 2, on occasion it may be necessary to actuate a control point 42 employing power levels that are not intrinsically safe and thus which must be shielded by explosion-proof housing 40. While such control points 42 may be controlled by non-intrinsically safe equipment, for example, an optional external controller 12, or by using a separate I/O rack communicating with I/O rack 24' via a communication module 30' and an intrinsically safe penetration circuit 34, this approach is cumbersome especially where only a single or a few hazardous control points must be controlled as it requires a costly network connection to the link 28'. It also may be desirable to place the control hardware adjacent to the hazardous control point 42 rendering the option of using the controller 12 impossible. Generally intrinsically safe modules 14' may not be mixed with non-intrinsically safe modules (i.e., modules controlling high powers) because of the risk of faults between intrinsically safe modules 14' and non-intrinsically safe modules 14.

Accordingly, the present invention permits the use of a bus isolator module 92 which may extend the backplane 52 of the intrinsically safe I/O rack 24' to attach to a non-intrinsically safe I/O module 14. The non-intrinsically safe I/O module 14 may control the number of control points 95 in the non-hazardous area and the hazardous control point 42.

Figure 7:
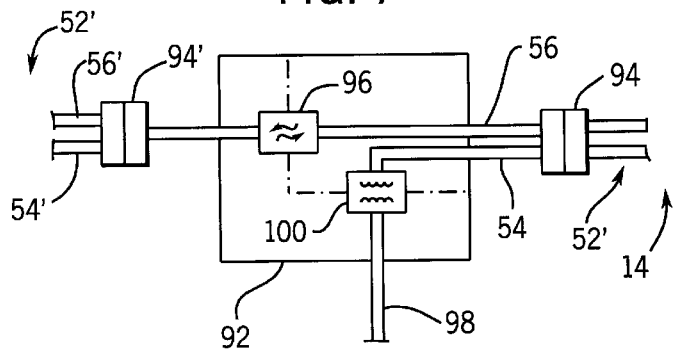
FIG. 7 is a detailed block diagram of the bus isolator of FIG. 3 showing the generation of intrinsically safe power and its interconnection and isolation of backplanes of I/O racks or controllers.

Referring now also to FIG. 7, the bus isolator module 92 employs connectors 94' that may connect onto standard connectors used to extend the backplane 52' when additional modules 14 are to be placed on an I/O rack 24. One connector 94' attaches to backplane 52' and in particular to the data lines 56' to transmit those data lines to a galvanic isolator 96 on the bus isolator module 92. In this case, the galvanic isolator may be simply series capacitances, one for each conductor however inductive (transformer) type isolation may also be used as well as optical type isolators. The galvanic isolator 96 provides the signals to a second connector 94 which may connect to a backplane 52 attached to a non-intrinsically safe module 14". The power lines 54' of the backplane 52' are not transmitted by the bus isolator module 92 but instead new safe power lines 54 are generated from a source of non-intrinsically safe power 98 received by isolator/power limiter 100 similar to isolator 48 previously described. This isolator/power limiter 100 provides power lines 54 to connector 94 to the module 14".

The power from isolator/power limiter 100 primarily is used to provide backplane power lines 54, however, small amounts of the power may be used for buffer amplifiers to extend the distance between backplane 52' and backplane 52 over the cables of the bus isolator module 92.

The bus isolator module 92 is extremely simple in construction and allows the mixing of intrinsically safe and non-intrinsically safe modules on what is logically the same I/O rack 24' (i.e., it appears from the serial link 28' to be one rack). Additional communication circuitry and backplane decoding is thus not required as would be the case if serial link 28 were used as the connecting medium.

Generally, an intrinsically safe module 14' once used with unprotected power may never again be used as an intrinsically safe module as a result of possible history of stressing that may have compromised its intrinsically safe quality. The bus isolator module 92 logically allows intrinsically safe modules 14' to be mixed with non-intrinsically safe modules 14 while physically keeping them separated.

Figure 8:
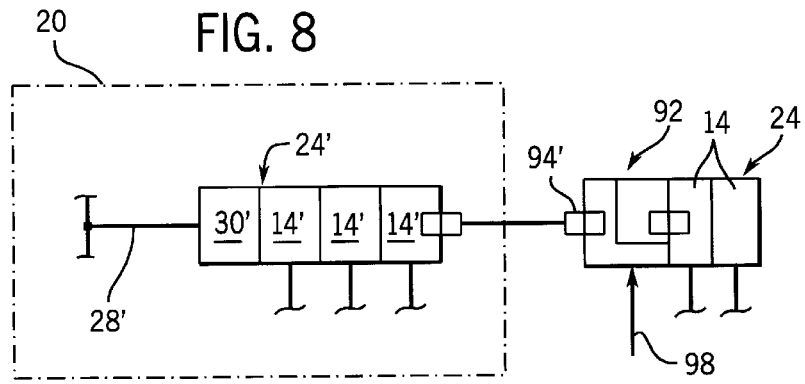
FIG. 8 is a schematic representation of one use of the bus isolator of FIG. 7.

Referring now to FIG. 8, the bus isolator module 92 may be used to connect an intrinsically safe I/O rack 24' in a hazardous area 20 to a non-intrinsically safe I/O rack 24 in the non-hazardous area with the non-intrinsically safe power 98 received by the bus isolator module 92 in the non-hazardous area used to power the modules 14 used to control non-intrinsically safe control points. A single communication module 30' in the hazardous area 20 receives serial link 28' and provides decoding both for I/O racks 24' and 24.

Figure 9:
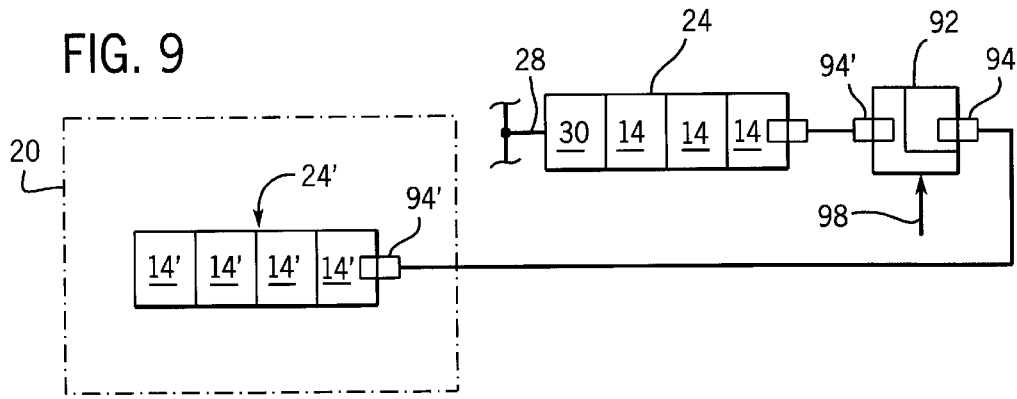
FIG. 9 is a schematic representation similar to FIG. 8 of a second use of a bus isolator of FIG. 7.

Alternatively as shown in FIG. 9, a serial link 28 may be received by I/O rack 24 having a communication module 30 and a number of functional modules 14 and the I/O rack 24 connected to the bus isolator module 92. The bus isolator module 92 may receive a source of non-intrinsically safe power 98 in the non-hazardous area and convert that power to intrinsically safe power to be forwarded through connector 94 to intrinsically safe I/O rack 24' not having a communication module 30' or any connection directly with serial link 28'. Since the bus isolator module 92 is always located in the non-hazardous area, it is a simple matter to provide it with non-intrinsically safe power 98. Generally the bus isolator module 92 allows a cost effective means to mix intrinsically and non-intrinsically safe equipment in the same I/O group.

Whereas the present invention allows high speed communication signals to be transmitted freely into hazardous areas 20 on standard copper media, it will be understood that the same techniques may be used with fiber optic-type communication devices. In the preferred embodiment the penetration circuit 34 shown in FIG. 2 connecting serial link 28' to 28 incorporates such a fiber optic technique.

The above description has been that of a preferred embodiment of the present invention, it will occur to those that practice the art that many modifications may be made without departing from the spirit and scope of the invention. For example, some aspects of the invention may be used even when the entire industrial controller is not in the hazardous area but, for example, where the I/O modules are in the hazardous area and the controller is outside of the hazardous area. In order to apprise the public of the various embodiments that may fall within the scope of the invention, the following claims are made.

We claim:

1. An industrial controller for use in hazardous environments and configured to read inputs from an industrial process and provide outputs to the industrial process under the direction of a stored control program, the industrial controller comprising:
   a power supply limited in output to avoid the generation of sparks with sufficient energy to ignite a flammable atmosphere during a fault condition in the power supply;
   a serial network port receiving and transmitting data over serial network media using signals limited in power to avoid the generation of sparks with sufficient energy to ignite a flammable atmosphere during a fault condition of the serial network;
   a processor executing the stored program and communicating with the serial network and receiving power from the power supply;
   a plurality of interface circuits receiving power from the power supply and communicating electrical signals over interface lines between the industrial controller and the industrial process, the electrical signals limited in power to avoid the generation of sparks with sufficient energy to ignite a flammable atmosphere during a fault condition of the interface lines; and
   digital circuitry receiving power from the power supply and communicating data between the serial network port and at least one of the interface circuits;
   whereby the industrial controller may be operated from a location wholly within a hazardous location.

2. The industrial controller of claim 1 wherein the digital circuitry operates on a voltage of less than ten volts.

3. The industrial controller of claim 1 wherein the serial network port includes a high pass filtering circuitry selectively removing low frequencies from the signals.

4. The industrial controller of claim 3 wherein the high pass filtering circuitry limits frequencies less than one megahertz.

5. The industrial controller of claim 1 wherein the serial network port includes circuitry limiting the instantaneous power of the data signals transmitted to less than a predetermined power value.

6. The industrial controller of claim 1 wherein the serial network port includes isolation circuitry galvanically isolating the industrial controller from the serial network.

7. The industrial controller of claim 1 including, in addition, voltage step-up means communicating with at least one interface circuit to receive the power from the power supply at a first voltage and step up the voltage to a second voltage connected to the signal lines.

8. The industrial controller of claim 1 wherein at least one of the interface circuits provides electrical power to at least a portion of the industrial process and wherein the interface circuit includes a power limiting circuitry limiting the electrical power to a level that avoids the generation of sparks with sufficient energy to ignite a flammable atmosphere during a fault condition of the portion of the industrial process.

9. The industrial controller of claim 8 wherein the power limiting circuitry includes a series connected limiting resistance sized to limit current flow to the portion of the industrial process to a level that avoids the generation of sparks with sufficient energy to ignite a flammable atmosphere during a fault condition of the portion of the industrial process, and a current monitoring circuit limiting heating of the limiting resistor.

10. The industrial controller of claim 1 wherein at least one of the interface circuits provides electrical power to at least a portion of the industrial process and wherein the interface circuit includes power limiting circuitry limiting the electrical power to a predetermined level that preserves sufficient power for operation of the industrial controller.

11. A method of operating an industrial controller in a hazardous environment, the industrial controller reading inputs from an industrial process and providing outputs to the industrial process under the direction of a stored control program generating new outputs, the industrial controller having a serial link communicating outside the hazardous environment, the method comprising the steps of:
   (a) placing the industrial controller inside the hazardous area;
   (b) limiting the power supplied to the industrial controller to produce first power signals having a first power level unlikely to produce electrical sparks that will ignite a flammable atmosphere during a fault condition of the industrial controller; and
   (c) limiting the power of the first power signals transmitted over the serial link to produce second power signals having a second power level, wherein the second power level is less than the first power level and is unlikely to produce electrical sparks that will ignite a flammable atmosphere during a fault condition of the serial link;
   (d) selectively removing low frequencies from the signals transmitted over the serial link using a high pass filter; and
   (e) executing the control program on the industrial controller and communicating inputs and outputs between the industrial controller and the controlled process and as signals on the serial link.

12. The method of claim 11 wherein the industrial controller is comprised of digital circuitry and the method of step (c) operates the control unit on a voltage of less than ten volts.

13. The method of claim 11 wherein the high pass filtering circuitry limits frequencies to those not likely to cause ignition of hazardous substances.

14. The method of claim 11 wherein the serial network port includes circuitry limiting an instantaneous power of the data signals and the method of step (e) limits the instantaneous power transmitted to less than a predetermined power value.

15. The method of claim 11 wherein the serial network port includes isolation circuitry and the method of step (e) galvanically isolates the industrial controller from the serial network.

16. The method of claim 11 wherein the industrial controller provides electrical power to at least a portion of the industrial process and including the step (f) of limiting the electrical power to the industrial process to a level that avoids the generation of sparks with sufficient energy to ignite a flammable atmosphere during a fault condition of the portion of the industrial process.

17. The method of claim 16 wherein the step (f) includes the steps of passing the electrical power through a series resistance sized to limit current flow and the step of monitoring the current flow through the series resistance to lower a driving voltage to decrease heating of the series resistance.

18. An industrial controller for use in hazardous environments and configured to read inputs from an industrial process and provide outputs to the industrial process under the direction of a stored control program, the industrial controller comprising:

a power supply limited in output to produce power signals having a sufficiently low power level to avoid the generation of sparks with sufficient energy to ignite a flammable atmosphere during a fault condition in the power supply;

a serial network port receiving and transmitting data over serial network media using signals limited in power to avoid the generation of sparks with sufficient energy to ignite a flammable atmosphere during a fault condition of the serial network;

a processor executing the stored program to control an industrial process and to communicate with the serial network and receiving power from the power supply;

a plurality of interface circuits receiving power from the power signals and communicating electrical signals over interface lines between the industrial controller and the industrial process;

a high pass filter configured to selectively remove low frequencies from the signals communicated over the interface lines; and a digital circuitry receiving power from the power supply and communicating data between the serial network port and one of the interface circuits;

whereby the industrial controller may be operated from a location wholly within a hazardous location.

19. A method of operating an industrial controller in a hazardous environment, the industrial controller reading inputs from an industrial process and providing outputs to the industrial process under the direction of a stored control program generating new outputs, the industrial controller having a serial link communicating outside the hazardous environment, the method comprising the steps of:

(a) placing the industrial controller inside the hazardous area;

(b) limiting the power supplied to the industrial controller to a level unlikely to produce electrical sparks that will ignite a flammable atmosphere during a fault condition of the control unit; and (c) limiting the power of signals transmitted over the serial link to a level unlikely to produce electrical sparks that will ignite a flammable atmosphere during a fault condition of the serial link;

(e) executing the control program on the control unit and communicating inputs and outputs between the industrial controller and the controlled process and as signals on the serial link.

* * * * *